US012656949B2

(12) United States Patent
　Tella et al.

(10) Patent No.: US 12,656,949 B2
(45) Date of Patent: Jun. 16, 2026

(54) COALESCING MULTIPLE SMALL WRITES TO LARGE FILES OR MULTIPLE WRITES TO A NUMBER OF SMALL FILES TO GENERATE LARGER COMPRESSIBLE CHUNKS FOR INLINE COMPRESSION

(71) Applicant: NetApp, Inc., San Jose, CA (US)

(72) Inventors: Venkateswarlu Tella, Bangalore (IN); Ankur Vineet, Gujarat (IN); Palak Sharma, Haryana (IN); Sindhushree K N, Mysore (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 18/785,672

(22) Filed: Jul. 26, 2024

(65) Prior Publication Data

US 2026/0029912 A1 　　Jan. 29, 2026

(51) Int. Cl.
　　*G06F 3/06* 　　　　(2006.01)
(52) U.S. Cl.
　　CPC .......... *G06F 3/0608* (2013.01); *G06F 3/0641* (2013.01); *G06F 3/0671* (2013.01)
(58) Field of Classification Search
　　None
　　See application file for complete search history.

(56) References Cited

U.S. PATENT DOCUMENTS 6,348,881 B1 * 2/2002 Buer ................... H03M 7/3084
　　　　　　　　　　　　　　　　　375/240
7,079,051 B2 * 7/2006 Storer ..................... H03M 7/30
　　　　　　　　　　　　　　　　　341/51

8,396,841 B1 * 3/2013 Janakiraman ......... G06F 3/0608
　　　　　　　　　　　　　　　　　707/802

(Continued)

FOREIGN PATENT DOCUMENTS

WO 　　WO-2013157103 A1 * 10/2013 ............. G06F 3/067

OTHER PUBLICATIONS

GreenNet, "Understanding file sizes", May 29, 2016, pp. 1-11, https://web.archive.org/web/20160529003517/https://www.greennet.org.uk/support/understanding-file-sizes (Year: 2016).*

(Continued)

*Primary Examiner* — Christopher D Birkhimer
(74) *Attorney, Agent, or Firm* — JAFFERY WATSON HAMILTON & DESANCTIS LLP

(57) ABSTRACT

Systems and methods for coalescing writes to facilitate generation of larger compression groups for use during inline compression are provided. According to one embodiment, inline compression performed by a storage system is improved by temporarily staging writes to in-memory data structures (e.g., inline storage efficiency (ISE) index nodes (inodes)) and performing coalescing in a deferred manner to generate larger compression groups for use during performance of inline compression. In one example, all files may be treated in the same manner, for example, by staging writes within a staging area and then processing the staged data by an inline compression workflow. In another example, the staging processing for small and large file may be different. For instance, the data blocks associated with small files may be staged separately from data blocks associated with large files and/or data blocks of multiple small files may be staged within the same ISE inode.

14 Claims, 11 Drawing Sheets

(56) References Cited

U.S. PATENT DOCUMENTS

| | | | | |
|---|---|---|---|---|
| 8,572,163 | B1 * | 10/2013 | Bromley | G06F 16/1748 707/650 |
| 8,732,403 | B1 * | 5/2014 | Nayak | G06F 3/0619 711/170 |
| 9,715,434 | B1 * | 7/2017 | Xu | G06F 3/067 |
| 9,733,836 | B1 * | 8/2017 | Garg | G06F 3/0631 |
| 10,108,543 | B1 * | 10/2018 | Duggal | G06F 11/14 |
| 10,108,544 | B1 * | 10/2018 | Duggal | G06F 11/14 |
| 10,228,858 | B1 * | 3/2019 | Stoakes | G06F 3/0641 |
| 10,346,076 | B1 * | 7/2019 | Jonnala | G06F 3/067 |
| 10,585,611 | B2 | 3/2020 | Sharma et al. | |
| 10,664,165 | B1 * | 5/2020 | Faibish | G06F 3/0638 |
| 10,795,812 | B1 * | 10/2020 | Duggal | G06F 3/067 |
| 2008/0144079 | A1 * | 6/2008 | Pandey | H03M 7/30 358/1.15 |
| 2009/0041230 | A1 * | 2/2009 | Williams | G06F 11/1448 707/999.204 |
| 2009/0089483 | A1 * | 4/2009 | Tanaka | G06F 3/0608 711/E12.008 |
| 2009/0204650 | A1 * | 8/2009 | Wong | G06F 16/1744 |
| 2010/0077013 | A1 * | 3/2010 | Clements | G06F 16/1748 707/822 |
| 2010/0082672 | A1 * | 4/2010 | Kottomtharayil | G06F 11/1451 711/E12.001 |
| 2010/0088296 | A1 * | 4/2010 | Periyagaram | G06F 16/183 707/E17.014 |
| 2010/0125553 | A1 * | 5/2010 | Huang | G06F 11/1453 707/661 |
| 2010/0174881 | A1 * | 7/2010 | Anglin | G06F 11/1453 711/E12.103 |
| 2010/0281081 | A1 * | 11/2010 | Stager | G06F 9/5022 707/814 |
| 2010/0333116 | A1 * | 12/2010 | Prahlad | G06Q 50/188 713/153 |
| 2013/0166861 | A1 * | 6/2013 | Takano | G06F 3/064 711/161 |
| 2014/0049413 | A1 * | 2/2014 | Agarwal | H03M 7/30 341/87 |
| 2014/0114932 | A1 * | 4/2014 | Mallaiah | G06F 3/0641 707/E17.032 |
| 2014/0143517 | A1 * | 5/2014 | Jin | G06F 12/023 711/171 |
| 2015/0205816 | A1 * | 7/2015 | Periyagaram | G06F 11/1453 707/827 |
| 2015/0261776 | A1 * | 9/2015 | Attarde | G06F 16/1748 707/664 |
| 2016/0246799 | A1 * | 8/2016 | Constantinescu | G06F 16/1748 |
| 2016/0350324 | A1 * | 12/2016 | Wang | G06F 16/137 |
| 2017/0010809 | A1 * | 1/2017 | Hironaka | G06F 3/0689 |
| 2017/0038978 | A1 * | 2/2017 | Li | G06F 3/0611 |
| 2017/0123711 | A1 * | 5/2017 | Kathpal | G06F 3/0608 |
| 2017/0308320 | A1 * | 10/2017 | Sharma | G06F 3/0641 |
| 2018/0095674 | A1 * | 4/2018 | Alameldeen | G06F 3/064 |
| 2018/0138921 | A1 * | 5/2018 | Arelakis | H03M 7/3071 |
| 2018/0314727 | A1 * | 11/2018 | Epstein | G06N 5/01 |
| 2019/0205035 | A1 * | 7/2019 | Mizushima | G06F 12/04 |
| 2020/0097404 | A1 * | 3/2020 | Cason | G06F 12/0646 |
| 2020/0310686 | A1 * | 10/2020 | Truong | G06F 3/061 |
| 2021/0036714 | A1 * | 2/2021 | Martin | G06F 13/1668 |
| 2021/0374021 | A1 * | 12/2021 | Santhakumar | G06F 3/067 |
| 2023/0106987 | A1 | 4/2023 | Shemer et al. | |
| 2023/0267217 | A1 * | 8/2023 | Natanzon | G06F 21/602 713/193 |
| 2023/0334023 | A1 * | 10/2023 | Natanzon | G06F 16/1734 |

OTHER PUBLICATIONS

Glenn Bramich, "File sizes explained: your guise to KB, MB, GB and more", Feb. 24, 2023, pp. 1-11, https://web.archive.org/web/20230224084343/https://www.geeks2u.com.au/geekspeak/file-sizes-explained-your-guide-to-kb-mb-gb-and-more/ (Year: 2023).*

"Storage Efficiency ONTAP 9", NetApp, May 10, 2024.

* cited by examiner

COALESCING MULTIPLE SMALL WRITES TO LARGE FILES OR MULTIPLE WRITES TO A NUMBER OF SMALL FILES TO GENERATE LARGER COMPRESSIBLE CHUNKS FOR INLINE COMPRESSION

BACKGROUND

Field

Various embodiments of the present disclosure generally relate to storage systems and storage efficiency mechanisms used by storage systems. In particular, some embodiments relate to improving inline compression performed by a storage system by temporarily staging writes in in-memory data structures and performing coalescing in a deferred manner to generate larger compression groups for use during performance of inline compression.

Description of the Related Art

Storage environments may implement various functionality to improve storage efficiency. For example, storage controllers that are part of a distributed storage system may implement one or both of deduplication and compression to reduce the amount of data stored on storage devices utilized by the distributed storage system.

Compression techniques may operate on data associated with write requests issued by clients (e.g., applications) of the storage system before write operations are performed to persist the data to the storage devices. Such compression is performed as part of the inline write path and may be referred to as inline compression. Inline compression is generally processing resource (e.g., central processing unit (CPU) intensive. Additionally, inline compression should generally avoid increasing write latency experienced by clients. As a result, storage systems typically perform lightweight inline compression and subsequently perform additional post-process compression to address deficiencies of the lightweight compression after the data has been stored on the storage devices (e.g., via a periodic background compression workflow). For example, there are numerous scenarios in which current inline compression techniques do not achieve optimal sizes of compressible chunks (which may be referred to herein as compression groups). Unfortunately, however, accessing data by a storage system during the performance of data compression processing (e.g., while a post-process compression workflow is in the midst of compressing data residing on the storage devices) may result in negative impacts, such as read and/or write amplification.

SUMMARY

Systems and methods are described for coalescing writes to facilitate generation of larger compression groups for use during inline compression. According to one embodiment, as data blocks of write requests are received from a client of a storage system, multiple data blocks associated with a given file are staged until a trigger event of one or more trigger events occurs. After occurrence of the trigger event, an inline compression group is generated by coalescing a group of multiple of the staged data blocks. Prior to persisting data associated with the inline compression group to a data storage medium of the storage system, compression is performed based on the inline compression group.

According to another embodiment, as data blocks of write requests are received from a client of a storage system, multiple data blocks associated with multiple files are staged until a trigger event of one or more trigger events occurs in which each of the files has a size of less than or equal to a predetermined or configurable number of kilobytes (KB). After occurrence of the trigger event, an inline compression group is generated by coalescing a group of multiple of the staged data blocks. Prior to persisting data associated with the inline compression group to a data storage medium of the storage system, compression is performed based on the inline compression group.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figures 1A, 1B, 1C, 1D:
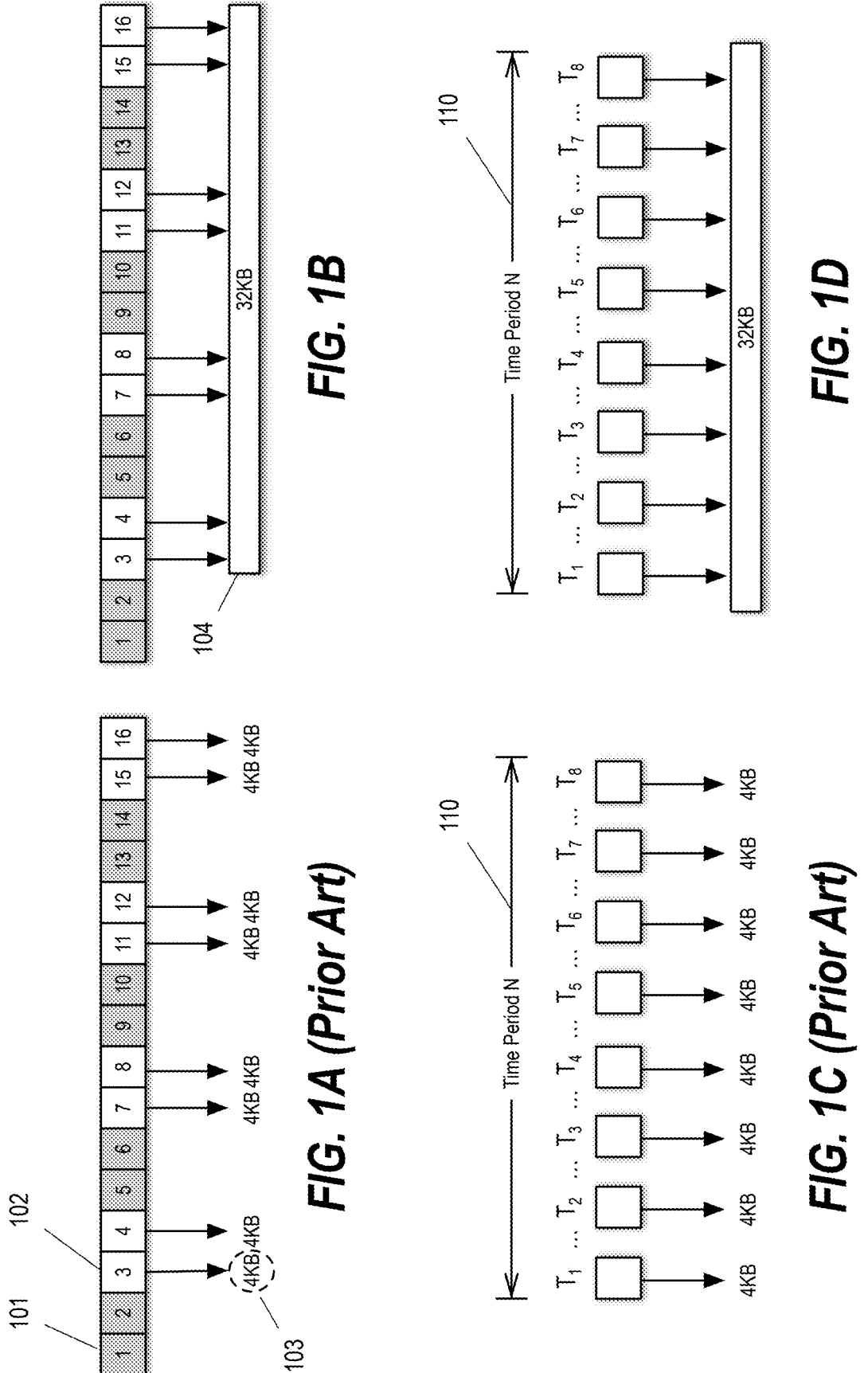
FIG. 1A is a block diagram conceptually illustrating generation of multiple compression groups for use during inline compression after performance of deduplication in accordance with an existing inline compression approach.
FIG. 1B is a block diagram conceptually illustrating generation of a single larger compression group for use during inline compression after performance of deduplication in accordance with an embodiment of the present disclosure.
FIG. 1C is a block diagram conceptually illustrating generation of multiple compression groups for use during inline compression based on receipt of sporadic writes, representing contiguous writes that are separated by time, within a particular time period in accordance with an existing inline compression approach.
FIG. 1D is a block diagram conceptually illustrating generation of a single larger compression group for use during inline compression based on the sporadic writes within the same time period as FIG. 1C in accordance with an embodiment of the present disclosure.

Systems and methods are described for coalescing writes to facilitate generation of larger compression groups for use during inline compression. As noted above, there may be adverse impacts on performance of a storage system when attempting to access data residing on storage devices of the storage system while a post-process compression workflow is also operating on the data at issue. Meanwhile, in order to achieve desired storage efficiencies, such post-process compression is necessitated by the limitations of current lightweight inline compression approaches.

Embodiments described herein attempt to achieve various benefits, including (i) improving the storage footprint by doing inline compression on using an optimal compression group size as part of the inline write path (i.e., prior to persistence of the data to the storage devices of the storage device), (ii) having the compression engine take into account read amplification and the number of decompressions for future reads, and (iii) reducing reliance upon or eliminating altogether the need for periodic background compression (e.g., post-process compression) and thereby reducing read and write amplification.

There are various scenarios, including the performance of inline compression after performance of deduplication processing, sporadic writes (at different times) to the same file, random (non-sequential) writes to different portions of a file, and writes to multiple small files that result in inefficiencies during inline compression due to the use of small compression groups, for example, of size 4 KB or 8 KB. Examples of current behavior and new behavior based on the inline compression approach proposed herein are described further below to illustrate how the proposed approach achieves larger compression groups for all such scenarios.

In general, embodiments described herein propose coalescing multiple writes (either of a predetermined or configurable batch size or over a predetermined or configurable time period) to allow creation of a larger compression group (e.g., of size 32 KB) for use by the inline compression workflow, thereby allowing better compression ratios to be achieved. In one embodiment, all files (regardless of size) may be treated in the same manner, for example, staging writes within a staging area and then processing the staged data by an inline compression workflow. For example, as data blocks of write requests are received from a client of a storage system, multiple of the data blocks associated with a given file may be staged in memory until a trigger event of one or more trigger events occurs. After occurrence of the trigger event, an inline compression group may then be generated by coalescing a group of the staged data blocks. Prior to persisting data associated with the inline compression group to a data storage medium of the storage system, inline compression may be performed based on the inline compression group. As described further below, the data may be segregated at the level of an inline storage efficiency (ISE) index node (inode), and staged at the ISE inode-level for better batch processing.

According to one embodiment, the staging processing for small and large file is different. The small files may be identified based on a predetermined or configurable size, which is usually smaller than the optimal compression group size. The data blocks of write requests are received from a client of a storage system, multiple of the data blocks associated with a number of small files (e.g., having a size of less than a predetermined or configurable size) may be staged separately from data blocks associated with large files (e.g., having a size of greater than or equal to the predetermined or configurable size) until a trigger event of one or more trigger events occurs. After occurrence of the trigger event, an inline compression group may be generated by coalescing a group of multiple of the staged data blocks. Prior to persisting data associated with the inline compression group to a data storage medium of the storage system, inline compression may be performed based on the inline compression group, thereby performing compression by merging the data blocks across a number of small files.

While for illustrative purposes, a compression group size of 32 kilobytes (KB) is used in various examples described herein, it is to be appreciated the compression group size may be larger (e.g., 64 KB, 96 KB, 128 KB, etc.) depending on the particular implementation. Similarly, as small files and large files are generally defined with reference to the compression group size, the examples herein in which small files are less than 32 KB and large files are greater than 32 KB are for illustrative purposes only and may change along with implementation changes to the compression group size.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). A storage system may be part of a larger storage system (e.g., a cluster of multiple nodes representing a distributed storage system). Depending on the particular implementation, the storage system may be an on-premise storage solution or a cloud-based storage solution (e.g., run on one or more virtual machines (VMs) or as one or more containerized instances, as the case may be) within a public cloud provider.

As used herein, the term "storage operating system" generally refers to computer-executable code operable on a computer to perform a storage function that manages data access and may, in the case of a storage system (e.g., a node or a storage cluster), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein. Illustratively, the storage operating system may be the Data ONTAP operating system available from NetApp, Inc., San Jose, Calif. that implements the Write Anywhere File Layout (WAFL) file system. However, it is expressly contemplated that any appropriate storage operating system may be enhanced for use in accordance with the inventive principles described herein. As such, where the term "WAFL" is employed, it should be taken broadly to refer to any file system (e.g., a copy-on-write file system, a write-anywhere file system, a write in place file system, or the like) that is otherwise adaptable to the teachings of this disclosure. In the context of various examples described herein the file system of a distributed storage system illustratively implements an exemplary a file system having an on-disk format representation that is block-based using, e.g., 4 kilobyte (KB) blocks and using index nodes (inodes), different from the in-memory ISE inodes described herein for use in connection with inline compression, to identify files and file attributes (such as creation time, access permissions, size and block location). The file system may also use files to store metadata describing the layout of its file system; these metadata files include, among others, an inode file. A file handle, i.e., an identifier that includes an inode number, may be used to retrieve an inode from disk.

As used herein, an "inline storage efficiency index node" or an "ISE inode" generally refers to a data structure that is used by a file system of a storage system to temporarily store information relating to writes. In various embodiments described herein, ISE inodes are used to facilitate performance of write coalescing in a deferred manner by allowing larger compression groups to be generated during performance of inline compression by the file system. Depending on the particular implementation, ISE inodes may be in a one-to-one or one-to-many relationship with files and may include, potentially among other things, one or more file handles of the file or files associated with the ISE inode at issue and a list of data blocks associated with the file(s) that are awaiting compression.

As used herein, a "compression group" generally refers to a chunk of data that is compressed as a whole and, after compression, is persisted to persistent storage of a storage system in fewer data blocks than the number of data blocks that would otherwise be required in uncompressed form. The size of a compression group is generally a multiple of the size of a given data block. For example, embodiments herein may coalesce eight small writes of 4 KB data blocks (to the same large file) or to multiple small files to create a 32 KB compression group that after compression may be stored within a single 4 KB data block on disk. While various examples described herein may use specific data block and compression group sizes (e.g., 4 KB and 32 KB, respectively) for purposes of providing concrete examples, it is to be appreciated such data block and compression group sizes are used for illustrative purposes only and are not intended to be limiting. For example, the use of compression groups of 64 KB, 96 KB, 128 KB, or larger are specifically contemplated. In some examples, when a desired compression group size is not achievable as a result of an insufficient number of data blocks having been written to a given large file or one or more small files over a predetermined or configurable time period, the use of smaller compression groups of 16 KB, 8 KB, or 4 KB may be used as appropriate.

As used herein a "small file" generally refers to a file having a size of less than a threshold. In this context, "small" is a relative term that may be determined with reference to the compression group size used by the storage system. Generally, a file is considered a small file when its size is less than the size of the compression group. So, for example, when the size of the compression group used for inline compression is 32 KB, a file may be considered small if it's size is less than 32 KB. As such, it is to be appreciated what is considered a small file may change based on the size of the compression group utilized by the storage system As used herein a "large file" generally refers to a file having a size of greater than or equal to a threshold. In this context, "large" is a relative term that may be determined with reference to the compression group size used by the storage system. Generally, a file is considered a large file when its size is greater than or equal to the size of the compression group. So, for example, when the size of the compression group used for inline compression is 32 KB, a file may be considered large if it's size is greater than or equal to 32 KB. As such, it is to be appreciated what is considered a large file may change based on the size of the compression group utilized by the storage system As used herein, a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS Elastic Block Store (EBS) gp2, gp3, io1, and io2 volumes for EC2 instances) and various types of HDD volumes (e.g., AWS EBS st1 and sc1 volumes for EC2 instances).

As used herein, a "storage volume" or "volume" generally refers to a container in which applications, databases, and file systems store data. A volume is a logical component created for the host or client to access storage on one or more storage devices (e.g., SSDs or HDDs drive), cloud volume, or storage arrays. A volume may be created from the capacity available in storage pod, a pool, or a volume group. A volume has a defined capacity. Although a volume might consist of more than one drive, a volume appears as one logical component to the host. Non-limiting examples of a volume include a flexible volume and a flexgroup volume.

As used herein, a "flexible volume" generally refers to a type of storage volume that may be efficiently distributed across multiple storage devices or cloud volumes. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume.

As used herein a "consistency point" or "CP" generally refers to the act of writing data to a primary storage tier utilized by a storage system and updating active file system pointers. In some file systems, such as the WAFL file system, when the file system receives a write request, it commits the data to permanent storage before the request is confirmed to the writer (e.g., the client or host). Otherwise, if the storage system were to experience a failure with data only in volatile memory, that data would be lost, and underlying file structures could become corrupted. Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. Some virtual storage appliances may use NV storage backed by cloud volumes in place of NVRAM for journaling storage and for the buffer cache. Regardless of whether NVRAM or NV storage is utilized, the modified data may be periodically (e.g., every few seconds) flushed to the data storage media. The event of saving the modified data to the mass storage devices may be referred to as a CP. At a CP, the file system may save any data that was modified by write requests to persistent data storage media. Depending on the file system implementation, there may be one or more predefined or configurable triggers (CP triggers) including one or more triggers based on time, based on a number or write requests, and/or based on events occurring within the file system. Responsive to a given CP trigger (or at a CP), the file system may save any data that was modified by write requests to persistent data storage media. As will be appreciated, new or updated file system metadata may also be generated during a CP.

Overview and Comparison to Prior Approaches

The following discussion with reference to FIGS. 1A-H, is not intended to address specific implementation details of existing inline compression approaches or the improved inline compression approach proposed herein. Rather, FIGS. 1A-H and the associated description are intended to illustrate a number of write scenarios in which the inline compression approach proposed herein produces better results due to the proposed approaches' ability to generate larger compression groups. Algorithmic and architectural details regarding various embodiments of the proposed approach are described below with reference to FIGS. 2 and 5-10.

By way of introduction, the proposed inline compression approach seeks to achieve larger compression groups in the inline write path while also working to make future reads on the compressed data blocks friendly. For example, as described further below, a coalesce compression engine may seek to (i) reduce read amplification by keeping the data blocks to be compressed aligned (e.g., on X KB boundaries, where X is 32, 64, 96, 128, etc.) so subsequent reads of the compressed data can be served with fewer data blocks from persistent storage media of the storage system and (ii) also minimize the number of decompressions needed, thereby additionally reducing the decompression cost.

In various embodiments described, herein, inline compression groups are formed based on the following driving principles:

Compression is performed as much as possible with data blocks belonging to the same file. This helps achieve better compression ratios as data blocks belonging to the same file will generally result in higher compressibility as compared to when the compression involves blocks from different files.

The compression is performed as much as possible with data blocks that are closer in terms of spatial locality. This helps for future reads as a read-ahead engine (if implemented by the storage system) will usually prefetch nearby data blocks in an attempt to improve read performance.

The compression is performed with a preference for X KB-aligned file block numbers (FBNs), where X is 32, 64, 96, 128, etc. This facilitates serving of next reads with a minimal number of decompressions (assuming that future reads by the client will be a multiple of X KB aligned reads).

FIG. 1A is a block diagram conceptually illustrating generation of multiple compression groups (e.g., 103) for use during inline compression after performance of deduplication in accordance with an existing inline compression approach. In this example, it is assumed a number of write requests received by a storage system have resulted in write operations involving sixteen data blocks. Of the sixteen data blocks, eight (depicted with gray backgrounds) represent duplicate blocks (e.g., 101) identified by an inline deduplication process as containing data that is duplicative of donor blocks (e.g., associated with recently written data or read data stored within an in-core buffer cache or an external cache). The remaining eight data blocks (depicted with white backgrounds) represent non-duplicative data or unique data (e.g., 102) that will be persisted to storage by the storage system. Following the deduplication workflow, the non-duplicative data is processed by a lightweight inline compression workflow. The lightweight nature of the inline compression workflow at issue precludes it from combining data blocks that are non-sequential into the same compression group. As such, in the context of the present example, the best case is 8 KB compression groups and the worst case is 4 KB compression groups.

FIG. 1B is a block diagram conceptually illustrating generation of a single larger compression group (e.g., 104) for use during inline compression after performance of deduplication in accordance with an embodiment of the present disclosure. This examples illustrates given the same sequence of write operations, the inline compression approach proposed herein is able to generate a larger size compression group (in this case of size 32 KB) as a result of the ability to span multiple blocks-contiguous or not. As those skilled in the art will appreciate, by applying inline compression to a larger compression group, the data at issue typically contains less entropy, thereby allowing better a compression ratio to be achieved.

FIG. 1C is a block diagram conceptually illustrating generation of multiple compression groups for use during inline compression based on receipt of sporadic writes, representing contiguous writes that are separated by time, within a particular time period 110 in accordance with an existing inline compression approach. In this example, although the data blocks are contiguous, the inline compression approach is unable to take advantage of the sequential nature of the data because it cannot accommodate gaps in time and instead immediately performs compression of a given data block based on a 4 KB compression group.

FIG. 1D is a block diagram conceptually illustrating generation of a single larger compression group for use during inline compression based on sporadic writes within the same time period as FIG. 1C in accordance with an embodiment of the present disclosure. This examples illustrates given the same sporadic sequence of writes, the inline compression approach proposed herein is able to generate a larger size compression group (in this case of size 32 KB) as a result of the ability to span small gaps in time between receipt of the writes. As noted above, by applying inline compression to a larger compression group, better compression efficiency may be achieved.

Figures 1E, 1F, 1G, 1H:
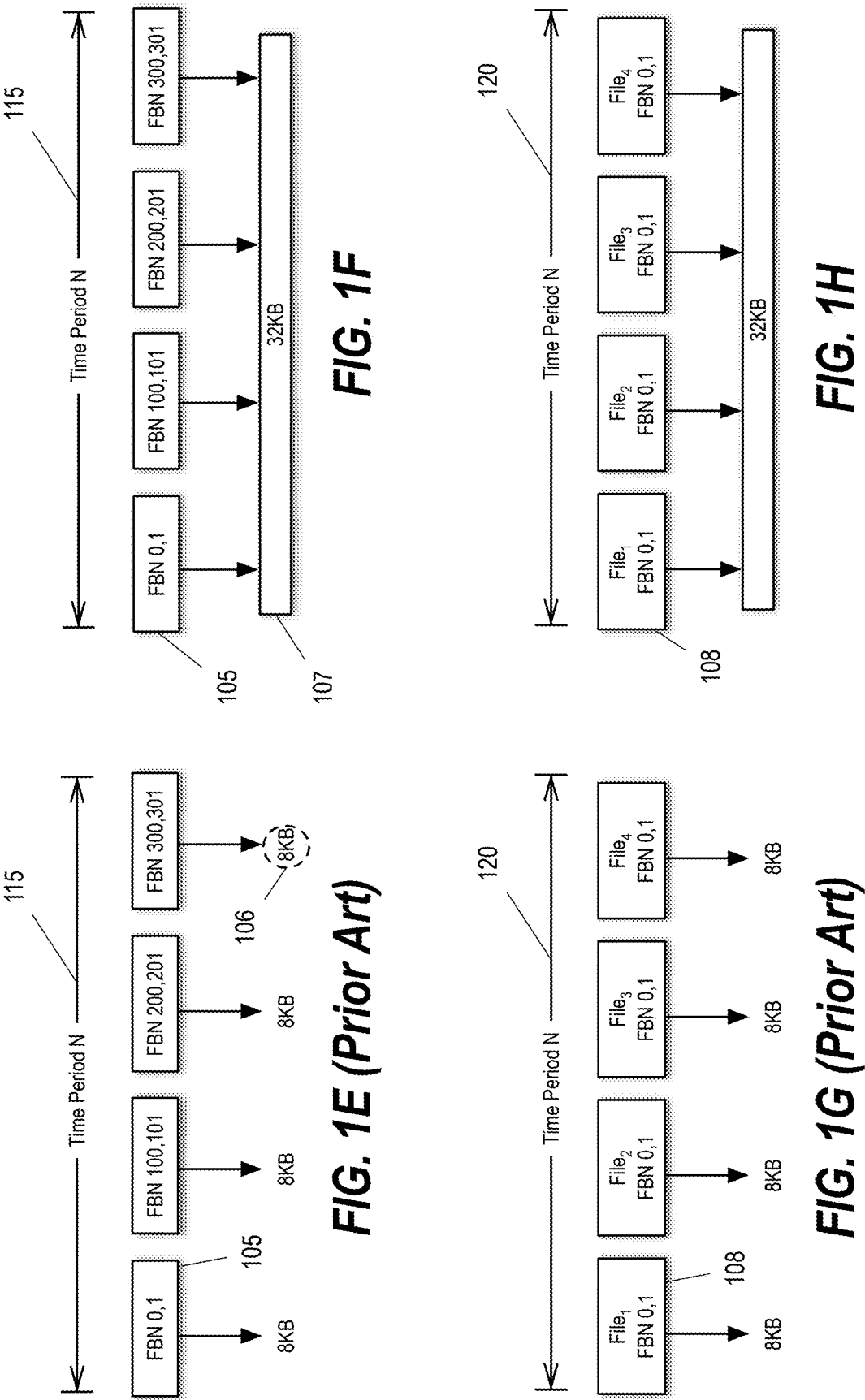
FIG. 1E is a block diagram conceptually illustrating generation of multiple compression groups for use during inline compression based on receipt of random writes to the same file within a particular time period in accordance with an existing inline compression approach.
FIG. 1F is a block diagram conceptually illustrating generation of a single larger compression group for use during inline compression based on receipt of random writes to the same file within the same time period as FIG. 1E in accordance with an embodiment of the present disclosure.
FIG. 1G is a block diagram conceptually illustrating generation of multiple compression groups for use during inline compression based on receipt of multiple writes to multiple small files within a particular time period in accordance with an existing inline compression approach.
FIG. 1H is a block diagram conceptually illustrating generation of a single larger compression group for use during inline compression based on receipt of multiple writes to multiple small files within the same time period as FIG. 1G in accordance with an embodiment of the present disclosure.

FIG. 1E is a block diagram conceptually illustrating generation of multiple compression groups (e.g., 106) for use during inline compression based on receipt of random writes to the same file within a particular time period 115 in accordance with an existing inline compression approach. In this example, writes involving 8 KB of data are requested to be performed to different portions (e.g., different file block numbers (FBNs)) of the same file. As the data blocks within a given write are contiguous, an 8 KB compression group may be generated for the data associated with each write; however, because the write requests are separated in time and have data block discontinuities between them, the existing inline compression approach can do no better than compression groups of size 8 KB.

FIG. 1F is a block diagram conceptually illustrating generation of a single larger compression group (e.g., 107) for use during inline compression based on receipt of random writes to the same file within the same time period as FIG. 1E in accordance with an embodiment of the present disclosure. This examples illustrates given the same set of random writes within the same time period 115, the inline compression approach proposed herein is able to generate a larger size compression group (in this case of size 32 KB) as a result of its ability to span small gaps in time between receipt of the writes and its ability to span multiple discontinuous blocks. Again, better compression results are expected when applying inline compression to a larger compression group.

FIG. 1G is a block diagram conceptually illustrating generation of multiple compression groups for use during inline compression based on receipt of multiple writes to multiple small files within a particular time period in accordance with an existing inline compression approach. In this example, a storage system is assumed to receive multiple writes involving 8 KB of data targeting different small files. As in FIG. 1E, because the data blocks within a given write are contiguous, an 8 KB compression group may be generated for the data associated with each write; however, due to the write requests being separated in time, relating to different files, and having data block discontinuities between them, 8 KB compression groups is the best this inline compression approach can achieve in this scenario.

FIG. 1H is a block diagram conceptually illustrating generation of a single larger compression group for use during inline compression based on receipt of multiple writes (e.g., 108) to multiple small files within the same time period as FIG. 1G in accordance with an embodiment of the present disclosure. This examples illustrates given the same set of writes to multiple files within the same time period 115, the inline compression approach proposed herein is able to generate a larger size compression group (in this case of size 32 KB) as a result of its ability to span small gaps in time between receipt of the writes, span multiple discontinuous blocks, and coalesce writes across multiple files. As above, the use of a larger compression group by the inline compression workflow is expected to provider better compression.

Example Storage System

Figure 2:
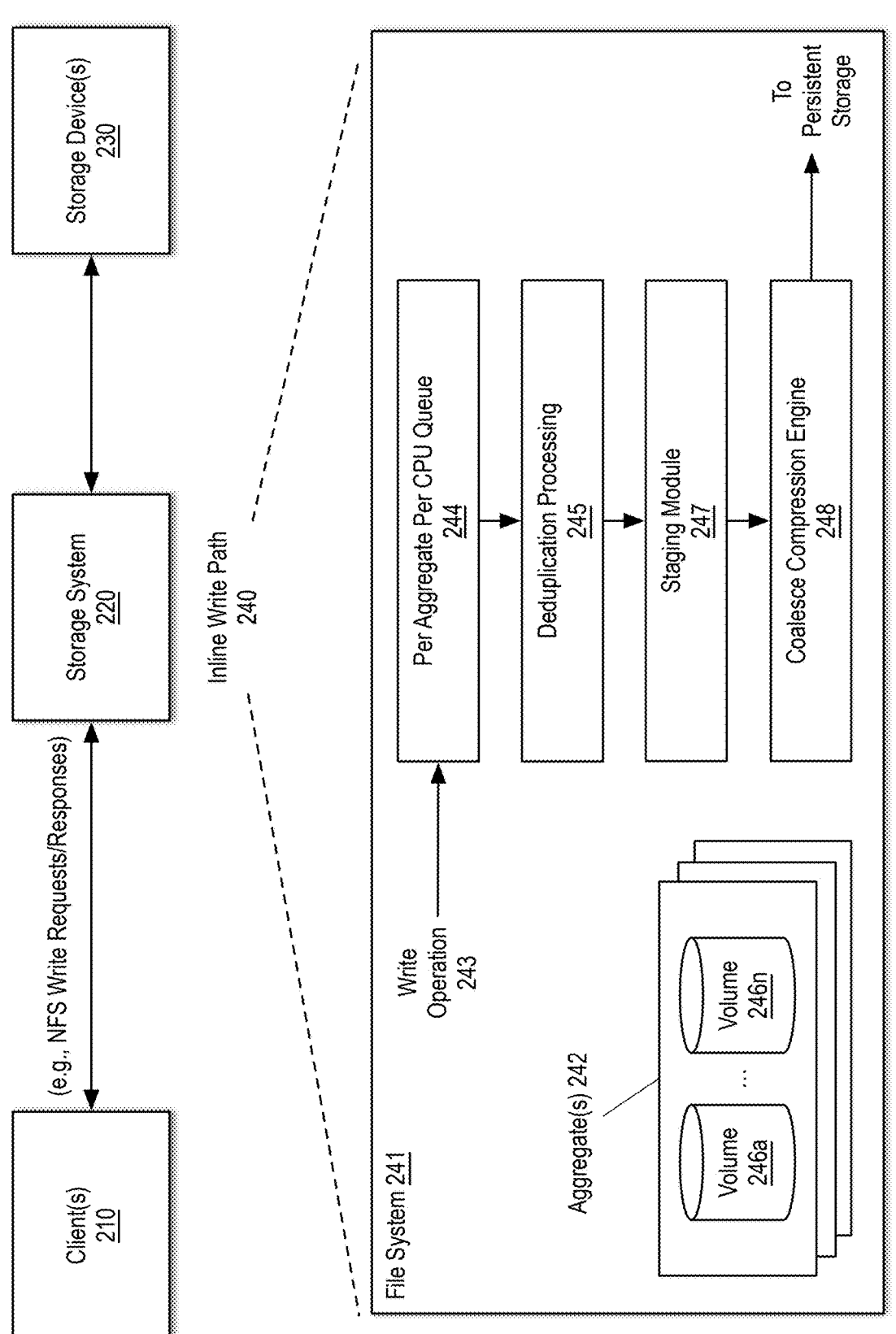
FIG. 2 is a block diagram conceptually illustrating a storage system that coalesces multiple writes to facilitate generation of larger compression groups for use during inline compression in accordance with an embodiment of the present disclosure.

FIG. 2 is a block diagram conceptually illustrating a storage system 220 that coalesces multiple writes to facilitate generation of larger compression groups for use during inline compression in accordance with an embodiment of the present disclosure. The storage system 220 may host/store application data on behalf of client(s) 210 of the storage system 220 on storage device(s) 230. In the context of the present example, a file system 241 (e.g., the WAFL file system) is shown maintaining one or more containers (e.g., aggregates 242), for example, each having a set of one or more storage device(s) 230, and presenting one or more volumes (e.g., volumes 246a-n) or logical unit numbers (LUNs) (not shown) housed therein to the one or more client(s) 210 to support hosting/storage of application data created, utilized, and/or modified by the one or more clients 210. Depending on the environment in which the storage system 220 is deployed, the storage devices 230 may represent a number of disks (e.g., as part of one or more storage arrays) or cloud volumes.

In various embodiments described inline compression is performed on write requests as part of an inline write path 240, which may or may not also include data deduplication. That is, inline compression is performed on data blocks associated with write operations (e.g., write operation 243) produced by the file system 241 based on client write requests received from a given client prior to the data associated with the write being persisted to the storage device(s) 230. The client write requests may be requests issued via a storage protocol (e.g., Network File System (NFS) or the like)

In the context of the present example, the inline write path 240 is shown including various functional units associated with the file system 241, including a per aggregate per CPU queue 244, an optional deduplication module 245, a staging module 247, and a coalesce compression engine 248.

The per aggregate per CPU queue 244 may be responsible for receiving and queueing write operations from the file system 241.

The optional deduplication module 245 may be responsible for pulling data blocks from the aggregate per CPU queue 244 and performing deduplication processing to identify data blocks that are duplicative of others already stored and thereby allowing a reference to be stored to the existing data rather than storing another copy of the existing data. After completion of deduplication processing the non-duplicative data blocks or unique data blocks may be processed by the staging module 247.

To enable the coalesce compression engine 248 to span multiple contiguous or discontinuous blocks within the same large file or across multiple small files and span small time gaps between writes and thereby form a larger compression group (e.g., preferably at least 32 KB), the staging module 247 may be responsible for temporarily buffering data blocks until either a batch of data blocks of a predetermined or configurable count has been received or a predetermined or configurable amount of time (e.g., measured in milliseconds) has passed as described further below. A non-limiting example of the staging module 247 is described further below with reference to FIG. 5.

The coalesce compression engine 248 may be responsible for performing the inline compression of a batch of data blocks buffered by the staging module 247. It may not always be the case that a larger compression group results from the temporary buffering of data blocks waiting for additional data blocks to be received for the same large file or for multiple small files; however, when a sufficient batch of data blocks (e.g., eight 4 KB data blocks) is collected during the allotted time frame, a compression group of at least 32 KB may be utilized for inline compression.

While for simplicity, in the context of the present example, the output of the coalesce compression engine 248 is shown going to persistent storage. It is to be appreciated, as discussed above, the act of writing data to the primary storage tier (e.g., storage device(s) 230) of the storage system 220 may be performed during a consistency point and such compressed data may actually be queued for write allocation during which the storage system chooses where on persistent media to write the data and associated metadata. The various functional units and modules described herein, and the processing described below, for example, with reference to the flow diagrams of FIGS. 7-10 may be implemented in the form of executable instructions stored on a machine readable medium and executed, for example, in the form of one or more services, microservices, or processes, by one or more processing resources (e.g., one or more of a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, and network storage systems or appliances), such as the node or storage controller described below with reference to FIG. 4.

Example Distributed Storage System Cluster

Figure 3:
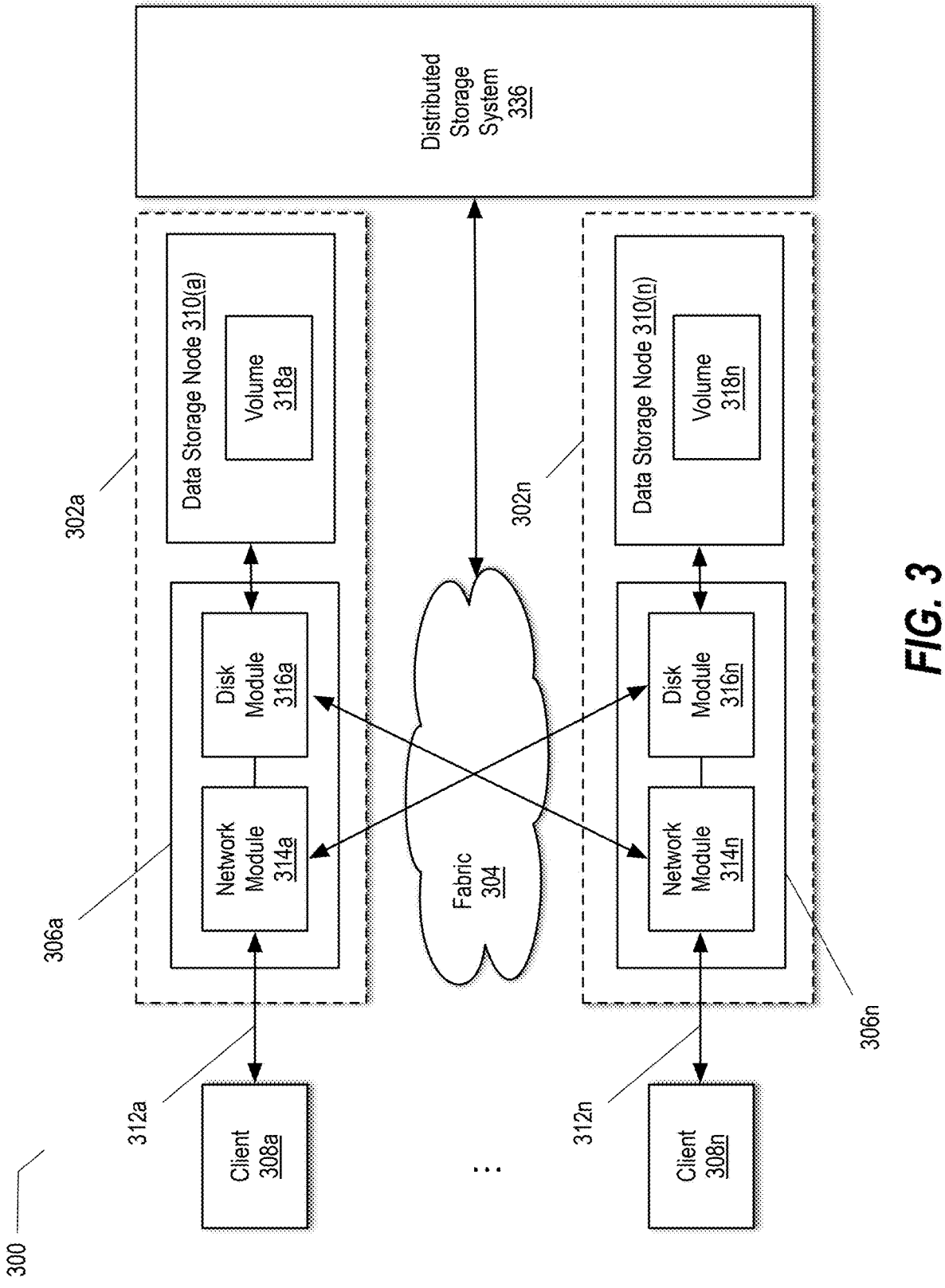
FIG. 3 is a block diagram illustrating an example of a clustered network environment with exemplary nodes in accordance with various embodiments of the present disclosure.

FIG. 3 is a block diagram illustrating an example of a clustered network environment 300 with exemplary nodes in accordance with various embodiments of the present disclosure. The clustered network environment 300 may implement one or more aspects of the techniques described and illustrated herein. The clustered network environment 300 includes data storage apparatuses 302*a-n* that are coupled over a cluster or cluster fabric 304 that includes one or more communication network(s) and facilitates communication between the data storage apparatuses 302*a-n* (and one or more modules, components, etc. therein, such as, computing devices 306*a-n*, for example), although any number of other elements or components can also be included in the clustered network environment 300 in other examples.

In accordance with one embodiment of the disclosed techniques presented herein, a file system (e.g., file system 241) implemented within each of computing devices 306*a-n* may perform the coalescing of multiple writes to allow creation of a larger compression group for use by an inline compression workflow, thereby allowing better compression ratios to be achieved. Various examples of architectural details and operations for performing write coalescing are described further below with reference to FIGS. 5-10.

In this example, computing devices 306*a-n* can be primary or local storage controllers or secondary or remote storage controllers (may be analogous to storage system 220 of FIG. 2 and which may be configured as a cluster) that provide client devices 308*a-n* with access to data stored within data storage devices 310*a-n* and storage devices of a distributed storage system 336. The computing devices 306*a-n* may be implemented as hardware, software (e.g., a storage virtual machine), or combination thereof. In some examples, the computing devices 306*a-n* may be used to host containers of a container orchestration platform.

The data storage apparatuses 302*a-n* and/or computing devices 306*a-n* of the examples described and illustrated herein are not limited to any particular geographic areas and can be clustered locally and/or remotely via a cloud network, or not clustered in other examples. Thus, in one example the data storage apparatuses 302*a-n* and/or computing device computing device 306*a-n* can be distributed over a plurality of storage systems located in a plurality of geographic locations (e.g., located on-premise, located within a cloud computing environment, etc.); while in another example a clustered network can include data storage apparatuses 302*a-n* and/or computing device computing device 306*a-n* residing in a same geographic location (e.g., in a single on-site rack).

In the illustrated example, one or more of the client devices 308*a-n*, which may be, for example, personal computers (PCs), computing devices used for storage (e.g., storage servers), or other computers or peripheral devices, are coupled to the respective data storage apparatuses 302*a-n* by network connections 312*a-n*.

In the illustrated example, one or more of the client devices 308*a-n* may be general-purpose computers configured to interact with one or more data storage apparatuses 302*a-n* in accordance with a client/server model of information delivery. That is, each client may request the services of a given data storage apparatus, and the data storage apparatus may return the results of the services requested by the client, by exchanging packets via a network (not shown) coupling the client devices and data storage apparatuses in communication. The client may issue packets including file-based access protocols, such as the Common Internet File System (CIFS) protocol or NFS protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (ISCSI) and SCSI encapsulated over Fibre Channel (FCP), when accessing information in the form of blocks. An administrative user (not shown) of the storage system may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Network connections 312*a-n* may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 308*a-n* may be general-purpose computers running applications and may interact with the data storage apparatuses 302*a-n* using a client/server model for exchange of information. That is, the client devices 308*a-n* may request data from the data storage apparatuses 302*a-n* (e.g., data on one of the data storage devices 310*a-n* managed by a network storage controller configured to process I/O commands issued by the client devices 308*a-n*, and the data storage apparatuses 302*a-n* may return results of the request to the client devices 308*a-n* via the network connections 312*a-n*.

The computing devices 306*a-n* of the data storage apparatuses 302*a-n* can include network or host computing devices that are interconnected as a cluster to provide data storage and management services, such as to an enterprise having remote locations, cloud storage (e.g., a storage endpoint may be stored within storage devices of the distributed storage system 336), etc., for example. Such computing devices 306*a-n* can be attached to the cluster fabric 304 at a connection point, redistribution point, or communication endpoint, for example. One or more of the computing devices 306*a-n* may be capable of sending, receiving, and/or forwarding information over a network communications channel, and could comprise any type of device that meets any or all of these criteria.

In an embodiment, the computing devices 306*a* and 306*n* may be configured according to a disaster recovery configuration whereby a surviving computing device provides switchover access to the data storage devices 310*a-n* in the event a disaster occurs at a disaster storage site (e.g., the computing device computing device 306*a* provides client device 312*n* with switchover data access to data storage devices 310*n* in the event a disaster occurs at the second storage site). In other examples, the computing device computing device 306*n* can be configured according to an archival configuration and/or the computing devices 306*a-n* can be configured based on another type of replication arrangement (e.g., to facilitate load sharing). Additionally, while two computing devices are illustrated in FIG. 3, any number of computing devices or data storage apparatuses can be included in other examples in other types of configurations or arrangements.

As illustrated in the clustered network environment 300, computing devices 306*a-n* can include various functional components that coordinate to provide a distributed storage architecture. For example, the computing devices 306*a-n* can include network modules 314*a-n* and disk modules 316*a-n*. Network modules 314*a-n* can be configured to allow the computing devices 306*a-n* (e.g., network storage controllers) to connect with client devices 308*a-n* over the storage network connections 312*a-n*, for example, allowing the client devices 308*a-n* to access data stored in the clustered network environment 300.

Further, the network modules 314*a-n* can provide connections with one or more other components through the cluster fabric 304. For example, the network module 314*a* of computing device computing device 306*a* can access the data storage device 310*n* by sending a request via the cluster fabric 304 through the disk module 316*n* of computing device computing device 306*n* when the computing device computing device 306*n* is available. Alternatively, when the computing device computing device 306*n* fails, the network module 314*a* of computing device computing device 306*a* can access the data storage device 310*n* directly via the cluster fabric 304. The cluster fabric 304 can include one or more local and/or wide area computing networks (i.e., cloud networks) embodied as Infiniband, Fibre Channel (FC), or Ethernet networks, for example, although other types of networks supporting other protocols can also be used.

Disk modules 316*a-n* can be configured to connect data storage devices 310*a-n*, such as disks or arrays of disks, SSDs, flash memory, or some other form of data storage, to the computing devices 306*a-n*. Often, disk modules 316*a-n* communicate with the data storage devices 310*a-n* according to a SAN protocol, such as SCSI or FCP, for example, although other protocols can also be used. Thus, as seen from an operating system on computing devices 306*a-n*, the data storage devices 310*a-n* can appear as locally attached. In this manner, different computing devices 306*a-n*, etc. may access data blocks, files, or objects through the operating system, rather than expressly requesting abstract files.

While the clustered network environment 300 illustrates an equal number of network modules 314*a-n* and disk modules 316*a-n*, other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 308*a-n* can be networked with the computing devices 306*a-n* in the cluster, over the storage connections 312*a-n*. As an example, respective client devices 308*a-n* that are networked to a cluster may request services (e.g., exchanging of information in the form of data packets) of computing devices 306*a-n* in the cluster, and the computing devices 306*a-n* can return results of the requested services to the client devices 308*a-n*. In one example, the client devices 308*a-n* can exchange information with the network modules 314*a-n* residing in the computing devices 306*a-n* (e.g., network hosts) in the data storage apparatuses 302*a-n*.

In one example, the storage apparatuses 302*a-n* host aggregates corresponding to physical local and remote data storage devices, such as local flash or disk storage in the data storage devices 310*a-n*, for example. One or more of the data storage devices 310*a-n* can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 318*a-n* in this example, although any number of volumes can be included in the aggregates. The volumes 318*a-n* (which may be analogous to volumes 246*a-n*) are virtual data stores or storage objects that define an arrangement of storage and one or more file systems within the clustered network environment 300. Volumes 318*a-n* can span a portion of a disk or other storage device, a collection of disks, or portions of disks, for example, and typically define an overall logical arrangement of data storage. In one example, volumes 318*a-n* can include stored user data as one or more files, blocks, or objects that may reside in a hierarchical directory structure within the volumes 318*a-n*.

Volumes 318*a-n* are typically configured in formats that may be associated with particular storage systems, and respective volume formats typically comprise features that provide functionality to the volumes 318*a-n*, such as providing the ability for volumes 318*a-n* to form clusters, among other functionality. Optionally, one or more of the volumes 318*a-n* can be in composite aggregates and can extend between one or more of the data storage devices 310*a-n* and one or more of the storage devices of the distributed storage system 336 to provide tiered storage, for example, and other arrangements can also be used in other examples.

In one example, to facilitate access to data stored on the disks or other structures of the data storage devices 310*a-n*, a file system (e.g., file system 241) may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 310*a-n* (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, quota trees (Qtrees), files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 310a-n can have one or more physical ports, wherein each physical port can be assigned a target address (e.g., SCSI target address). To represent respective volumes, a target address on the data storage devices 310a-n can be used to identify one or more of the LUNs. Thus, for example, when one of the computing devices 306a-n connects to a volume, a connection between the one of the computing devices 306a-n and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Example Storage System Node (or Storage Controller)

Figure 4:
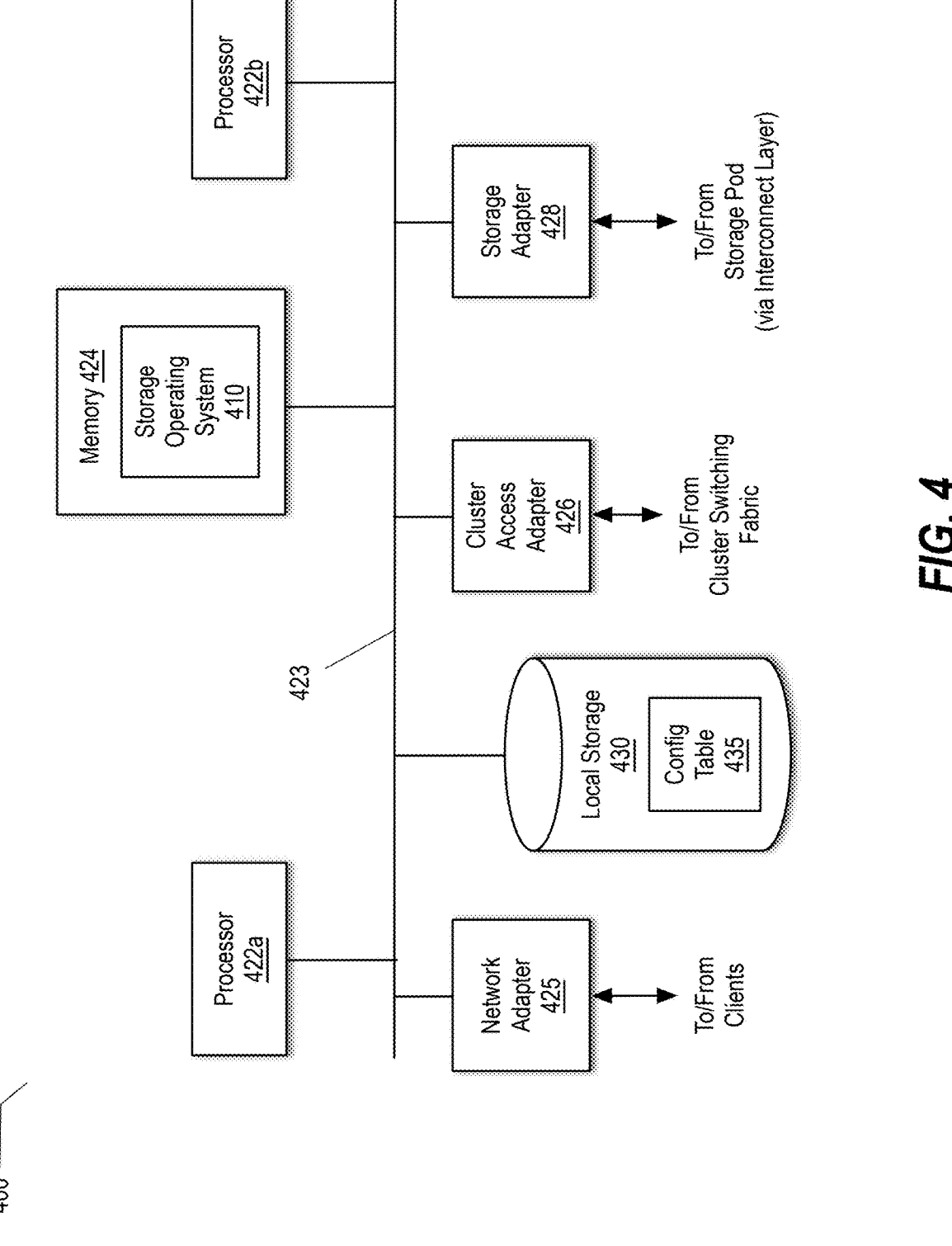
FIG. 4 is a block diagram illustrating a node in accordance with an embodiment of the present disclosure.

FIG. 4 is a block diagram illustrating a node 400 that is illustratively embodied as a storage system comprising multiple processors (e.g., processors 422a-b), a memory 424, a network adapter 425, a cluster access adapter 426, a storage adapter 428 and local storage 430 interconnected by a system bus 423. Node 400 may be analogous to nodes 310a and 310b of FIG. 3. The local storage 430 comprises one or more storage devices, such as disks, utilized by the node to locally store configuration information (e.g., in configuration table 435). The cluster access adapter 426 comprises a plurality of ports adapted to couple the node 400 to other nodes of the cluster (e.g., cluster 400). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 426 is utilized by the network and disk element for communicating with other network and disk elements in the cluster.

In the context of the present example, each node 400 is illustratively embodied as a dual processor storage system executing a storage operating system 410 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 400 may alternatively comprise a single or more than two processor system. Illustratively, one processor (e.g., processor 422a) may execute the functions of the network element (e.g., network element 320a or 320b) on the node, while the other processor (e.g., processor 422b) may execute the functions of the disk element (e.g., disk element 350a or 350b).

The memory 424 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 410, portions of which is typically resident in memory and executed by the processing elements, functionally organizes the node 400 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 425 comprises a plurality of ports adapted to couple the node 400 to one or more clients (e.g., client 380) over point-to-point links, wide area networks, virtual private networks implemented over a public network (Internet) or a shared local area network. The network adapter 425 thus may comprise the mechanical, electrical and signaling circuitry needed to connect the node to a network (e.g., computer network 340). Illustratively, the network may be embodied as an Ethernet network or a Fibre Channel (FC) network. Each client (e.g., client 380) may communicate with the node over network by exchanging discrete frames or packets of data according to pre-defined protocols, such as TCP/IP.

The storage adapter 428 cooperates with the storage operating system 410 executing on the node 400 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described in various examples herein, the information may be stored on disks (e.g., associated with storage pod 345). The storage adapter comprises a plurality of ports having input/output (I/O) interface circuitry that couples to the disks over an I/O interconnect arrangement, such as a conventional high-performance, FC link topology.

Storage of information on each disk array may be implemented as one or more storage "volumes" that comprise a collection of physical storage disks or cloud volumes cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a RAID group. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used.

While in the context of the present example, the node may be a physical host, it is to be appreciated the node may be implemented in virtual form. For example, a storage system or node of a storage system may be run (e.g., on a VM or as a containerized instance, as the case may be) within a public cloud provider. As such, a cluster representing a distributed storage system may be comprised of multiple physical nodes (e.g., node 400) or multiple virtual nodes (virtual storage systems).

Example Staging Module and Interactions therewith

Figure 5:
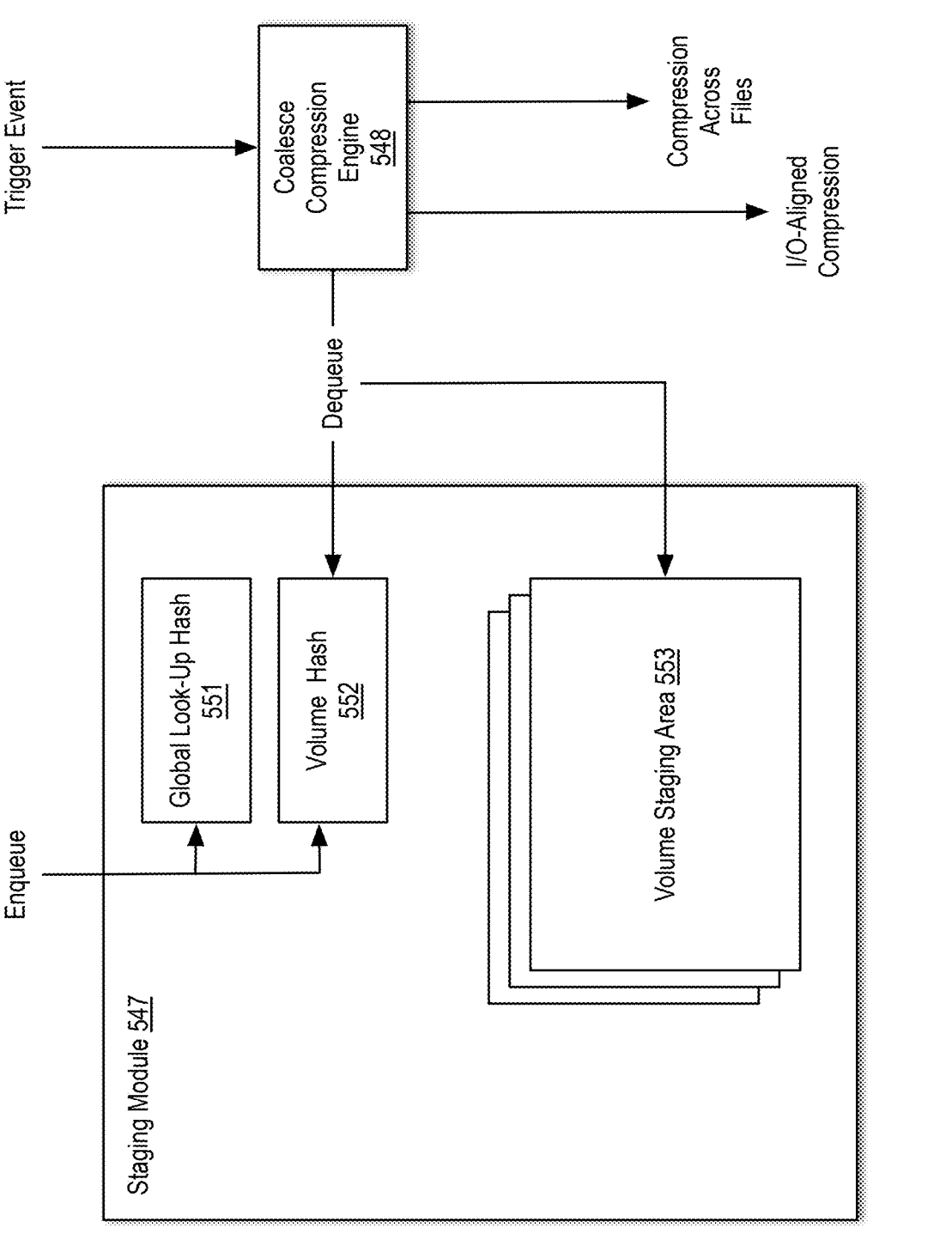
FIG. 5 is a block diagram conceptually illustrating additional architectural details and interactions with a staging module in accordance with an embodiment of the present disclosure.

FIG. 5 is a block diagram conceptually illustrating additional architectural details and interactions with a staging module 547 in accordance with an embodiment of the present disclosure. This example shows and describes example interactions between the staging module 547

(which may be analogous to staging module 247) and other functional units of a file system (e.g., file system 241) in which the staging module 547 operates. For example, the staging module 547 may expose an application programming interface (API) (not shown) including an enqueue method and a dequeue method for use by clients of the staging module 547, for example, within the file system to add (enqueue) or remove (dequeue) data blocks to or from the staging module 547. In one embodiment, subsequent to optional deduplication processing 245, a deduplication module (not shown) may enqueue unique data blocks for compression to the staging module 547.

In the context of the present example, the staging module 547 is show including a global look-up hash module 551, a volume hash module 552, and multiple volume staging areas (e.g., volume staging area 553), each of which may be used for buffering a list of data blocks for files associated with a given volume (e.g., volume 246a-n). As described further below, depending on whether large files and small files are staged separately, the volume staging areas may each be represented as one or more collections, groups, or lists of ISE inodes stored in-core (in memory) in which individual ISE inodes (e.g., in a one-to-one relationship with the files) may carry the list of data blocks. A non-limiting example a volume staging area is described further below with reference to FIG. 6.

As described further below, according to one embodiment, data blocks may be segregated at the ISE inode level for better batch processing. The global look-up hash module 551 may maintain within a global hash table (not shown) a global hash that is provisioned to accommodate a number of inodes corresponding to the number of allowed buffers in a CP. The global look-up hash module 551 may be utilized during an enqueue process initiated by a client of the staging module 547 to enqueue data blocks to the staging module 547 for compression. For example, the global look-up hash module 551 may be responsible for determining the existence or non-existence of a staging area (e.g., an ISE inode) for a given file associated with the data blocks. As described further below, when the staging area for the given file exists, the data blocks may be buffered within the staging area in the hope that additional data blocks for the given file will be received within a predefined or configurable time or count threshold so as to allow a larger compression group to be used during an inline compression workflow performed by the coalesce compression engine 548, which may be analogous to coalesce compression engine 248.

The volume hash module 552 may be utilized to facilitate independent walking/processing of the volume staging areas by the coalesce compression engine 548. For example, after occurrence of a trigger event of one or more trigger events that cause the inline compression workflow to be initiated by the coalesce compression engine 548, the coalesce compression engine 548 may evaluate those of the ISE inodes of the volume staging area with which the trigger event is associated. Depending on the particular implementation (e.g., whether large and small files are associated with different lists or groups of ISE inodes), the trigger events for a given volume may include one or more of file-level timers for large files, file-level batch thresholds for large files, a timer for small files, and a batch threshold for small files.

According to one embodiment, after the occurrence of a trigger event for starting an inline compression workflow, depending on the trigger event at issue, the coalesce compression engine may (i) dequeue multiple data blocks associated with a particular small or large file corresponding to the trigger event and that is associated with a particular volume to form an inline compression group and perform input/output (I/O)-aligned inline compression based on the inline compression group or (ii) dequeue multiple data blocks spanning multiple small files corresponding to the trigger event and that are associated with a particular volume to form an inline compression group and perform inline compression across the multiple small files. For example, assuming two independent trigger events, including (i) a batch size threshold of N data blocks (or an amount of data threshold of Y KB of data) for individual large files (or a group of small files) and (ii) a time threshold of X milliseconds (ms) to allow a given large file (or group of small files) to accumulate the desired batch size (or amount of data), in one embodiment, the first of achieving the N data block batch size threshold (or Y KB data accumulation threshold) or expiration of an X ms timer will result in a trigger event reported to the coalesce compression engine 548.

In one embodiment, ISE inodes may be maintained at per-volume granularity (e.g., within corresponding volume staging areas) to facilitate processing at a volume level and/or at an aggregate (set of volumes) level. According to one embodiment, the lifecycle of an ISE inode involves creation after the first write operation to a corresponding file and freeing, for example, when the ISE inode has not had work accumulated for the past few CPs.

Example Volume Staging Area

Figure 6:
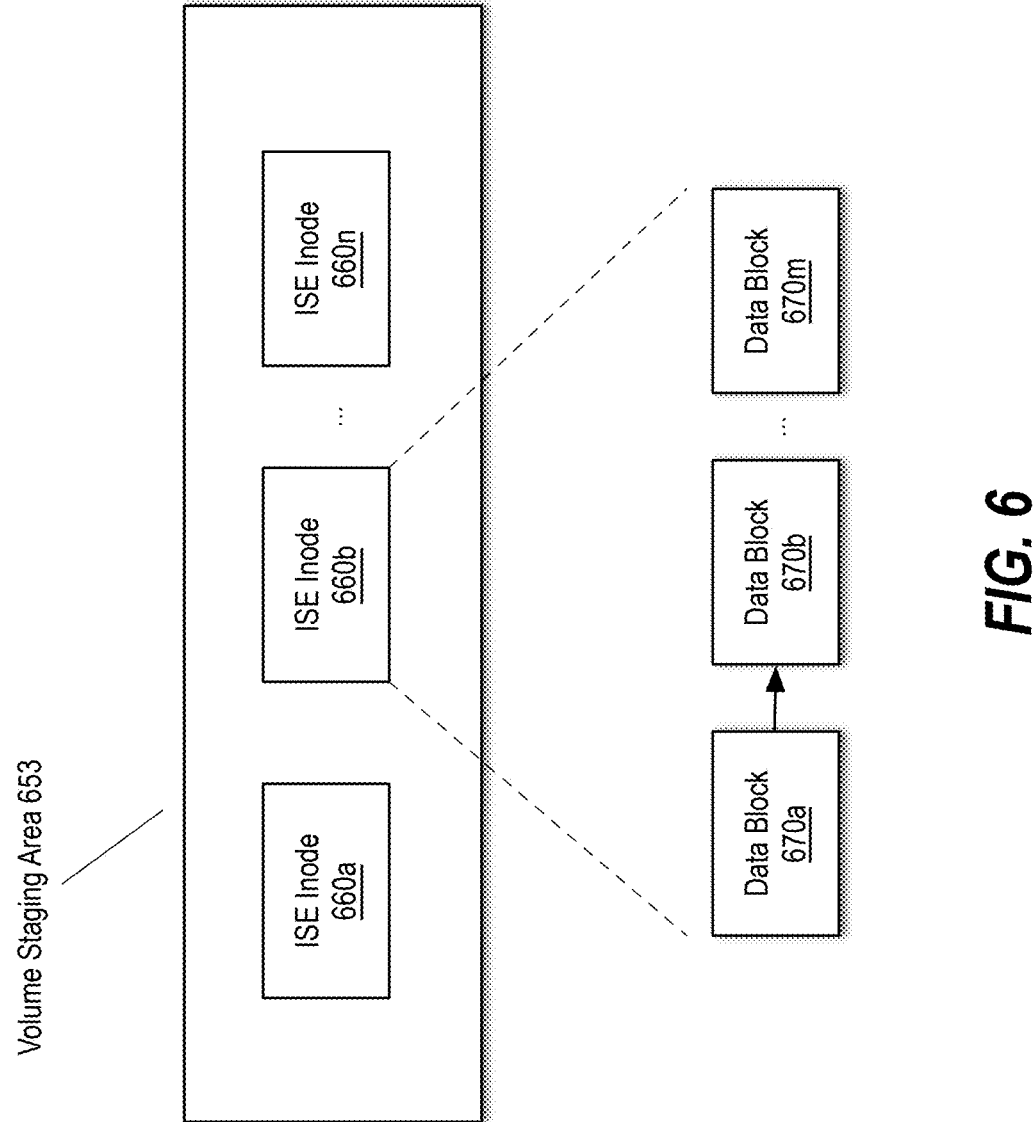
FIG. 6 is a block diagram conceptually illustrating an example a volume staging area in accordance with an embodiment of the present disclosure.

FIG. 6 is a block diagram conceptually illustrating an example a volume staging area 653 in accordance with an embodiment of the present disclosure. Volume staging area 653 may be analogous to volume staging area 553 of FIG. 5. In one embodiment, ISE inodes (e.g., 660a-n) are in-memory data structures including, potentially among other things, a file handle of the file at issue and a list of data blocks (e.g., data blocks 670a-m) associated with the file at issue that are awaiting compression.

Depending on the particular implementation, ISE inodes of small and large files associated with a particular volume may be commingled within the same list or group of ISE inodes for the particular volume and there may be a one-to-one mapping of ISE inodes to files. Alternatively, small files may be segregated from large files by implementing (i) a list of large file ISE inodes for buffering data of individual large files for which writes have been received and (ii) a separate list of ISE inodes (small file ISE inodes) for buffering data of individual small files. In one embodiment, in order to reduce the number of ISE inodes that may need to be traversed for small files, the number of ISE inodes (which may be referred to herein as "dummy ISE inodes") allowed to be used by small files may be limited to a predetermined or configurable threshold, thereby forcing multiple small files to share the same dummy ISE inode. In such a case, there may be fewer dummy ISE inodes than small files for which writes have been received and associated data blocks buffered.

While not mentioned above, background processing or other event processing may be implemented to handle stale inode-hash removal and/or clearing of stale ISE inodes. For example, when a given volume goes offline or an aggregate (e.g., a set of disks) hosting the given volume goes offline, the corresponding volume staging area may be cleared (e.g., all ISE inodes within the one or more lists of ISE inodes maintained in-core for the given volume may be removed). Additionally, a periodic walk of the ISE inode lists may be performed to identify ISE inodes that have remained unused for the past few CPs and such unused ISE inodes may be removed.

First Example of Inline Compression with Write Coalescing

Figure 7:
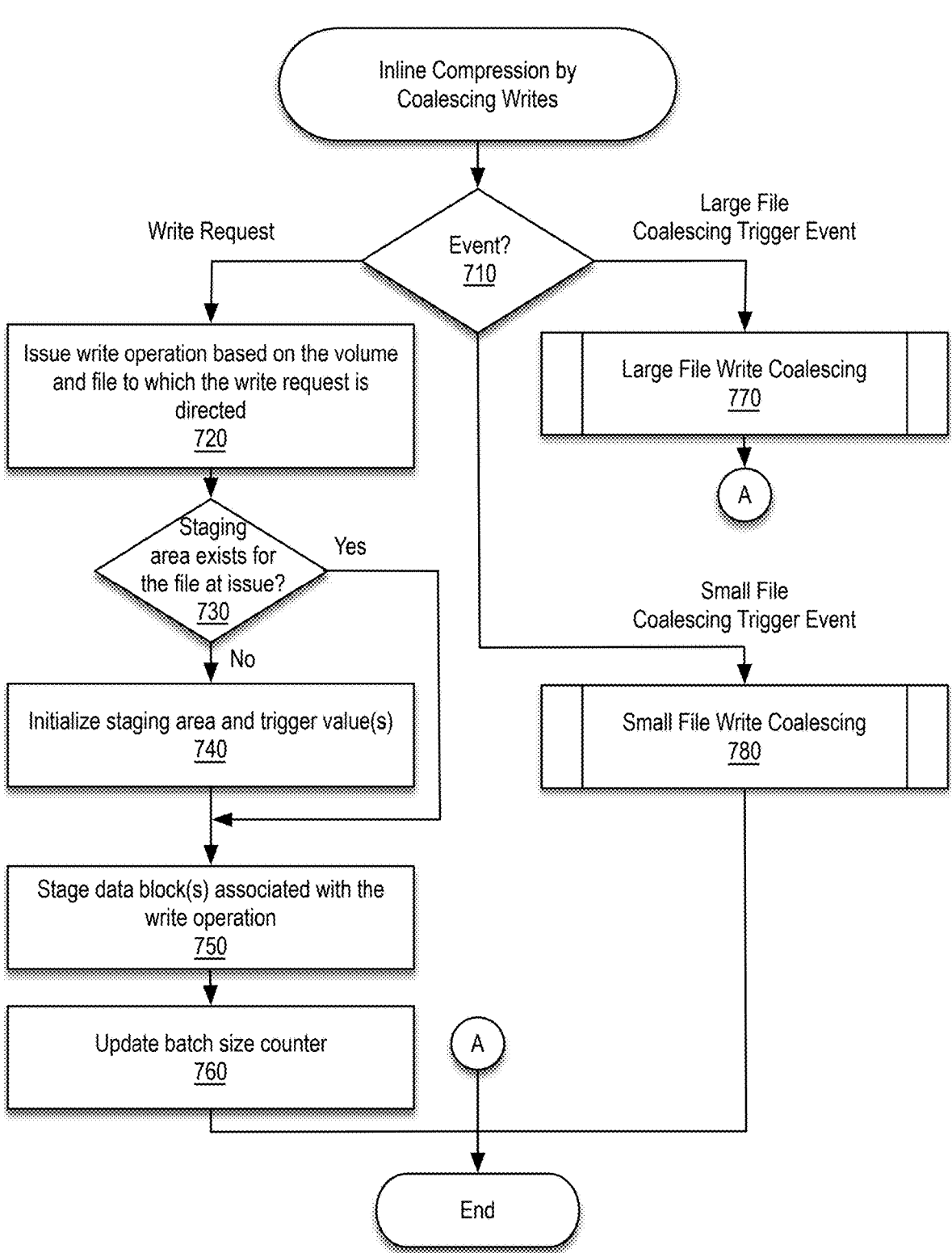
FIG. 7 is a flow diagram illustrating operations for performing inline compression by coalescing writes in accordance with an embodiment of the present disclosure.

FIG. 7 is a flow diagram illustrating operations for performing inline compression by coalescing writes in accordance with an embodiment of the present disclosure. The processing described with reference to FIG. 7 may be performed during an inline write path (e.g., inline write path 240) by a node (e.g., node 310a, node 310b, or node 400) of a storage system (e.g., storage system 220 or distributed storage system 300).

At decision block 710, a determination is made regarding an event that has triggered the inline write path workflow. If the event represents a write request (e.g., an NFS write request received from a client (e.g., one of client(s) 210 or client 380) of the storage system, a file system (e.g., file system 241) of the storage system, processing continues with block 720. If the event represents a large file coalescing trigger event (e.g., (i) expiration of a predetermined or configurable timer associated with a particular large file associated with a particular volume or (ii) an indication that a predetermined or configurable batch size or amount of data for the particular large file has been satisfied), then processing continues with block 770. If the event represents a small file coalescing trigger event (e.g., (i) expiration of a predetermined or configurable timer associated with a set of multiple small files associated with a particular volume or (ii) an indication that a predetermined or configurable batch size or amount of data for the set of multiple small files has been satisfied), then processing branches to block 780.

At block 720, the file system issues a write operation based on the volume and file to which the write request is directed, for example, as determined based on a file handle contained within the received write request.

At decision block 730, a determination is made regarding whether a staging area exists for the file at issue. If not, processing continues with block 740; otherwise, processing branches to block 750. In one embodiment, the existence/non-existence of the staging area may be determined based on a global hash, for example, maintained by a global look-up hash module (e.g., global look-up hash module 551).

At block 740, a staging area and trigger value(s) are initialized for the file(s) at issue. In one embodiment, initialization of a staging area for a given file involves creation of an ISE inode (e.g., one of ISE inodes 660a-n)) in-core (in memory) for the given file and adding an identifier associated with the ISE inode to both the global hash and a volume hash maintained by a volume hash module (e.g., volume hash module 522). In one embodiment, each ISE inode includes, among other things, a file handle of the file at issue and a list of data blocks associated with the file at issue that are awaiting compression. As noted herein, trigger value(s) may be tracked differently for large files and small files. For example, each individual large file may have dedicated trigger value(s), whereas as trigger value(s) may be tracked for multiple small files, In some examples, all files are staged within the same list of ISE inodes and there is a one-to-one correspondence between a given ISE inode and a given file. In other examples (e.g., described further below with reference to FIGS. 10, staging of large files and small files may be performed differently so as to segregate small files from large files and facilitate coalescing of data blocks across multiple small files. Further efficiencies may be achieved by limiting the number of dummy ISE inodes available for use by the list of small files to a predetermined or configurable threshold, thereby combining the data blocks of multiple small files into a single dummy ISE inode and reducing latency associated with traversing the list of small files.

Turning to initialization of trigger value(s), a batch size counter (measured in terms of a number of data blocks or quantity of data) for the large file or a group of small files may be set to zero and a timer may be started for the large file or the group of small files to establish an upper time limit on the amount of time for which an inline compression workflow will be delayed while awaiting receipt of additional data blocks for the large file or for the group of small files.

At block 750, one or more data blocks associated with the write operation are staged within the staging area initialized in block 740. For example, the data blocks may be added to the list of data blocks (e.g., data blocks 670a-m) of the ISE inode corresponding to the file at issue.

At block 760, the batch size counter relating to writes for the file (large file) or files (small files) at issue is updated to reflect the number of newly staged data blocks for the file(s) at issue. Alternatively, if it is the amount of data that is being tracked instead of a data block count to evaluate existence of a coalescing trigger event, then the batch size counter may be updated to reflect the quantity of data associated with the newly staged data blocks.

At block 770, large file write coalescing is performed. In general, large file write coalescing involves creation of an inline compression group based on data blocks that have been buffered during the time threshold for the file associated with the trigger event and performing inline compression based thereon. Further details regarding exemplary large file write coalescing is described below with reference to FIG. 8.

At block 780, small file write coalescing is performed. In general, small file write coalescing involves creation of an inline compression group based on data blocks that have been buffered during the time threshold for multiple small files associated with the trigger event and performing inline compression based thereon. Further details regarding exemplary small file write coalescing is described below with reference to FIG. 9.

Example Large File Write Coalescing

Figure 8:
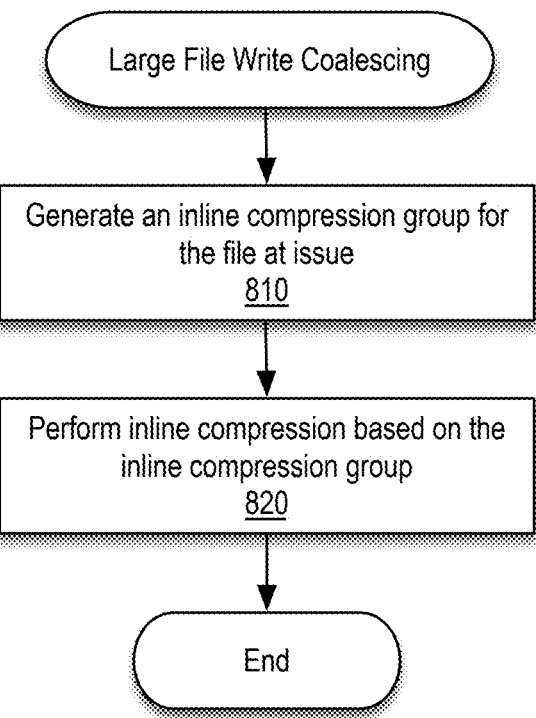
FIG. 8 is a flow diagram illustrating operations for performing large file write coalescing in accordance with an embodiment of the present disclosure.

FIG. 8 is a flow diagram illustrating operations for performing large file write coalescing in accordance with an embodiment of the present disclosure. The processing described with reference to FIG. 8 may be performed during an inline write path (e.g., inline write path 240) by a node (e.g., node 310a, node 310b, or node 400) of a storage system (e.g., storage system 220 or distributed storage system 300).

At block 810, an inline compression group is generated for the large file at issue. According to one embodiment, a coalesce compression engine (e.g., coalesce compression engine 248 or 548) may make use of a volume hash (e.g., volume hash 552) to identify a volume staging area (e.g., volume staging area 553) of multiple volume staging areas within which the data blocks awaiting compression for the large file at issue have been buffered. The identified volume staging area may then be traversed to locate the ISE inode (e.g., one of ISE inodes 660a-n) corresponding to the large file at issue. Then, a number of the data blocks (e.g., one or more of data blocks 670a-m) may be removed from the list of data blocks and used to generate a compression group for the large file at issue. For example, assuming eight or more 4 KB data blocks have been staged for the large file, then a 32 KB inline compression group may be created. If an insufficient number of data blocks have been collected/staged for the large file at issue during the predetermined or configurable time period to create the desired size inline compression group, an inline compression group of 16 KB, 8 KB, or 4 KB may be used as a fallback depending on the number of data blocks that have been collected/staged for the large file at issue.

As noted above, in one embodiment, the coalesce compression engine may make use of a dequeue method exposed by an API of a staging module (e.g., staging module 547) to handle the details regarding identifying the appropriate volume staging area, locating the ISE inode corresponding to the large file at issue, and supplying data blocks for the compression group.

At block 820, inline compression is performed based on the inline compression group generated in block 810.

Example Small File Write Coalescing

Figure 9:
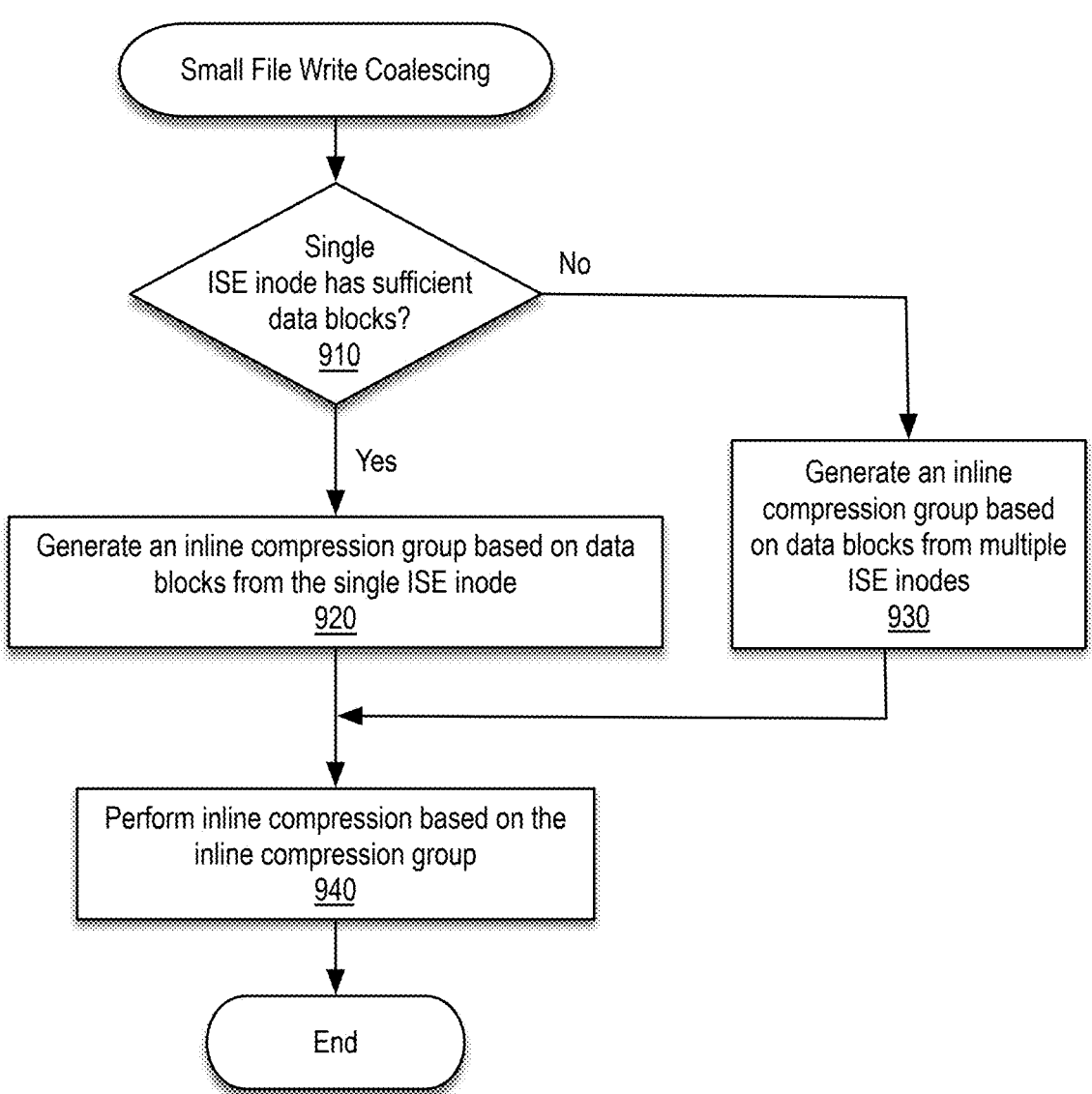
FIG. 9 is a flow diagram illustrating operations for performing small file write coalescing in accordance with an embodiment of the present disclosure.

FIG. 9 is a flow diagram illustrating operations for performing small file write coalescing in accordance with an embodiment of the present disclosure. The processing described with reference to FIG. 9 may be performed during an inline write path (e.g., inline write path 240) by a node (e.g., node 310a, node 310b, or node 400) of a storage system (e.g., storage system 220 or distributed storage system 300).

At decision block 910, a determination is made regarding whether a single ISE inode (e.g., one of ISE inodes 660a-n in the form of a small file ISE inode or a dummy ISE inode) has sufficient data blocks (e.g., a sufficient number of data blocks 670a-m) for generation of a desired sized inline compression group (e.g., 32 KB, 64 KB, etc.). If so, processing continues with block 920, otherwise, processing branches to block 930.

According to one embodiment, a coalesce compression engine (e.g., coalesce compression engine 248 or 548) may make use of a volume hash (e.g., volume hash 552) to identify a volume staging area (e.g., volume staging area 553) of multiple volume staging areas within which the data blocks awaiting compression for small files have been buffered. To the extent ISE inodes of small files are commingled with ISE inodes of large files, the identified volume staging area may then be traversed to locate the first small file ISE inode (e.g., one of ISE inodes 660a-n). If this small file ISE inode does not have a sufficient number of data blocks, then the next small file ISE inode may be evaluated and so on until one if found or until all small file ISE inodes have been exhausted. For example, assuming eight or more 4 KB data blocks have been staged within a single small file ISE inode, then a 32 KB inline compression group may be created.

As noted above, in one embodiment, the coalesce compression engine may make use of a dequeue method exposed by an API of a staging module (e.g., staging module 547) to handle the details regarding identifying the appropriate volume staging area, locating one or more small file ISE inodes as appropriate, and supplying data blocks for the compression group.

Alternatively, if small file ISE inodes are segregated from large file inodes, the list of small file ISE inodes may be traversed in a manner similar to that described above until one having a sufficient number of data blocks is found or until the list is exhausted. A similar approach may be used to traverse a separate list of ISE inodes (in this case, dummy ISE inodes) that are dedicated to staging of data blocks for multiple small files. As noted above, by limiting the number of dummy ISE inodes that may be used, a latency associated with traversing the list may be controlled.

Regardless of the approach for organizing, segregating, or commingling small file ISE inodes (or dummy ISE inodes)

and large file ISE inodes, if an ISE inode (a small file ISE inode or a dummy ISE inode) is found having a sufficient number of data blocks, the "Yes" branch is taken from decision block 910; otherwise, the "No" branch is taken from decision block 910.

At block 920, an inline compression group is generated based on the data blocks from the single ISE inode identified in block 910.

At block 930, an inline compression group is generated based on the data blocks extracted from multiple ISE inodes by performing a traversal similar to that described in decision block 910 but aggregating data blocks from multiple ISE inodes until a sufficient number is achieved. As above, if an insufficient number of data blocks have been collected/ staged for small files during the predetermined or configurable time period to create the desired size inline compression group, an inline compression group of 16 KB, 8 KB, or 4 KB may be used as a fallback depending on the number of data blocks that have been collected/staged for the small files.

At block 940, inline compression is performed based on the inline compression group generated in block 920 or 930.

Second Example of Inline Compression with Write Coalescing

Figure 10:
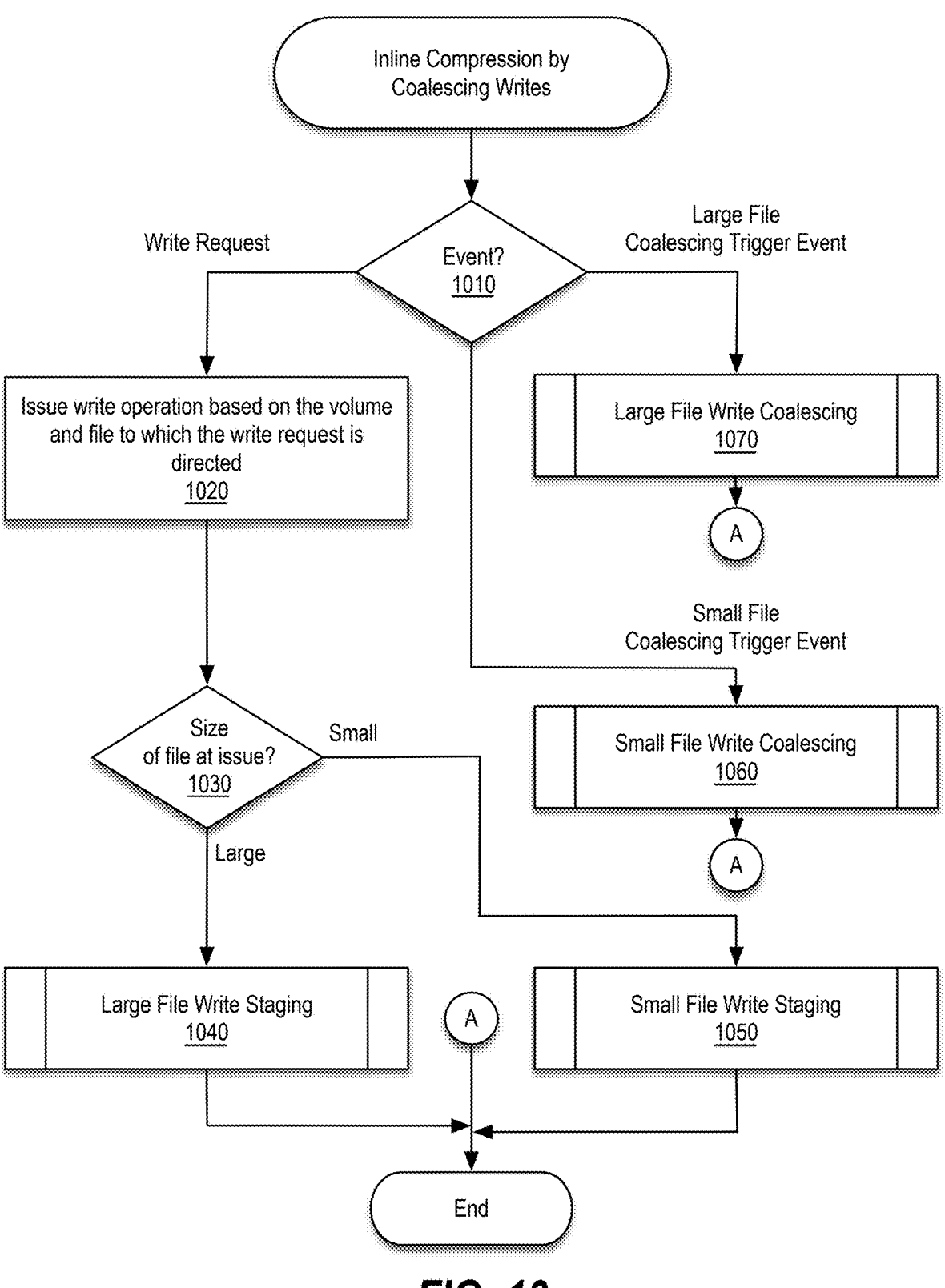
FIG. 10 is a high-level flow diagram illustrating operations for performing inline compression by coalescing writes in accordance with another embodiment of the present disclosure in which staging is performed differently for large files and small files.

FIG. 10 is a high-level flow diagram illustrating operations for performing inline compression by coalescing writes in accordance with another embodiment of the present disclosure in which staging is performed differently for large files and small files. The processing described with reference to FIG. 10 may be performed during an inline write path (e.g., inline write path 240) by a node (e.g., node 310a, node 310b, or node 400) of a storage system (e.g., storage system 220 or distributed storage system 300).

At decision block 1010, a determination is made regarding an event that has triggered the inline write path workflow. If the event represents a write request (e.g., an NFS write request received from a client (e.g., one of client(s) 210 or client 380) of the storage system, a file system (e.g., file system 241) of the storage system, processing continues with block 1020. If the event represents a large file coalescing trigger event (e.g., expiration of a predetermined or configurable timer associated with a particular large file associated with a particular volume or an indication that a predetermined or configurable batch size or number of data blocks for the particular large file has been satisfied), then processing continues with block 1070. If the event represents a small file coalescing trigger event (e.g., expiration of a predetermined or configurable timer associated with a set of multiple small files associated with a particular volume or an indication that a predetermined or configurable batch size or number of data blocks for the set of multiple small files has been satisfied), then processing branches to block 1060.

At block 1020, the file system issues a write operation based on the volume and file to which the write request is directed, for example, as determined based on a file handle contained within the received write request.

At decision block 1030, a determination is made regarding the size of the file at issue. If the file is determined to be a large file, processing continues with block 1040; otherwise, the file is a small file and processing branches to block 1050. In one embodiment, small files and large files may be distinguished based on the file offset to which is being written by the write operation. For example, according to one embodiment, when the file offset is greater than a predetermined or configurable threshold (e.g., 32 KB), then the file may be considered a large file. Similarly, in one embodiment, when the file offset is less than or equal to the predetermined or configurable threshold, then the file may be considered a small file.

At block 1040, large file write staging is performed as described above. In general, large file write staging involves the buffering of data blocks of large files within a group or list of ISE inodes in a one-to-one relationship with corresponding large files.

At block 1050, small file write staging is performed. In an embodiment in which small file ISE inodes are segregated from large file ISE inodes, small file write staging involves the buffering of data blocks of small files within a separate group or list of ISE inodes in which the number of small file ISE inodes may be limited and there may be fewer small file ISE inodes than small files to which writes have been received.

At block 1070, large file write coalescing is performed, for example, as described above with reference to FIG. 8.

At block 1060, small file write coalescing is performed, for example, as described above with reference to FIG. 9.

While in the context of the examples described with reference to FIGS. 7-10, a number of enumerated blocks are included, it is to be understood that other examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a-b*) within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device (e.g., local storage 230). Volatile media includes dynamic memory, such as main memory (e.g., memory 224). Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by the one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

as data blocks of a plurality of write requests are received from a client of a storage system;

initializing a timer for each large file of a plurality of large files to which a write request of the plurality of write requests is directed; and for a given file of the plurality of large files, staging a plurality of non-duplicative data blocks of the data blocks associated with the given file until a trigger event occurs, wherein each large file of the plurality of large files has a size greater than or equal to a predetermined or configurable number of kilobytes (KB) corresponding to a compression group size utilized by the storage system for performing inline compression, wherein the trigger event comprises:

the timer for the given file indicating a predefined or configurable time threshold has expired; or a number of the staged plurality of the non-duplicative data blocks associated with the given file meeting a predetermined or configurable threshold;

after occurrence of the trigger event, generating an inline compression group of the compression group size by coalescing a group of multiple of the staged plurality of the non-duplicative data blocks associated with the given file; and prior to persisting data associated with the inline compression group to a data storage medium of the storage system, performing compression based on the inline compression group.

2. The method of claim 1, wherein each of the write requests includes one or two data blocks having a size of less than 32 kilobytes (KB) and wherein the compression group size is greater than or equal to 32 KB.

3. The method of claim 1, wherein the staging includes creating a list of inline storage efficiency (ISE) index nodes (inodes) to track compression work in a memory of the storage system, wherein there is a one-to-one correspondence between the ISE inodes and files for which write have been received.

4. A method comprising:

as data blocks of a plurality of write requests are received from a client of a storage system;

initializing a timer for a plurality of small files to which write requests of the plurality of write requests are directed; and staging a plurality of non-duplicative data blocks of the data blocks spanning the plurality of files, until a trigger event occurs, wherein each small file of the plurality of small files has a size of less than or equal to a predetermined or configurable number of kilobytes (KB) corresponding to a compression group size utilized by the storage system for performing inline compression, wherein the trigger event comprises:

the timer indicating a predefined or configurable time threshold has elapsed since a first of the write requests was received; or a number of the staged plurality of the non-duplicative data blocks associated with the plurality of small files meeting a predetermined or configurable threshold;

after occurrence of the trigger event, generating an inline compression group of the compression group size by coalescing a group of multiple of the staged plurality of the non-duplicative data blocks; and prior to persisting data associated with the inline compression group to a data storage medium of the storage system, performing compression based on the inline compression group.

5. The method of claim 4, wherein each of the write requests includes one or two data blocks having a size of less than 32 kilobytes (KB) and wherein the compression group size is greater than or equal to 32 KB.

6. The method of claim 4, wherein the staging includes creating a list of inline storage efficiency (ISE) index nodes (inodes) to track compression work in a memory of the storage system.

7. The method of claim 6, wherein a number of the ISE inodes is limited and is potentially fewer than a number of files for which writes have been received.

8. A non-transitory machine readable medium storing instructions, which when executed by one or more processing resources of a storage system, cause the storage system to:

as data blocks of a plurality of write requests are received from a client of the storage system;

initializing a timer for each large file of a plurality of large files to which a write request of the plurality of write requests is directed; and for a given file of the plurality of large files, stage a plurality of non-duplicative data blocks of the data blocks associated with the given file until a trigger event occurs, wherein each large file of the plurality of large files has a size greater than or equal to a predetermined or configurable number of kilobytes (KB) corresponding to a compression group size utilized by the storage system for performing inline compression, wherein the trigger event comprises:

the timer for the given file indicating a predefined or configurable time threshold has expired; or a number of the staged plurality of the non-duplicative data blocks associated with the given file meeting a predetermined or configurable threshold;

after occurrence of the trigger event, generate an inline compression group of the compression group size by coalescing a group of multiple of the staged plurality of the non-duplicative data blocks associated with the given file; and prior to persisting data associated with the inline compression group to a data storage medium of the storage system, perform compression based on the inline compression group.

9. The non-transitory machine readable medium of claim 8, wherein each of the write requests includes one or two data blocks having a size of less than 32 kilobytes (KB) and wherein the compression group size is greater than or equal to 32 KB.

10. The non-transitory machine readable medium of claim 8, wherein the staging includes creating a list of inline storage efficiency (ISE) index nodes (inodes) to track compression work in a memory of the storage system, wherein there is a one-to-one correspondence between the ISE inodes and files for which writes have been received.

11. A storage system comprising:

one or more processing resources; and instructions that when executed by the one or more processing resources cause the storage system to:

as data blocks of a plurality of write requests are received from a client of a storage system;

initialize a timer for a plurality of small files to which write requests of the plurality of write requests are directed; and stage a plurality of non-duplicative data blocks of the data blocks spanning the plurality of files, until a trigger event occurs, wherein each small file of the plurality of small files has a size of less than or equal to a predetermined or configurable number of kilobytes (KB) corresponding to a compression group size utilized by the storage system for performing inline compression, wherein the trigger event comprises:

the timer satisfies a predefined or configurable time threshold; or a number of the staged plurality of the non-duplicative data blocks associated with the plurality of small files meeting a predetermined or configurable threshold;

after occurrence of the trigger event, generate an inline compression group of the compression group size by coalescing a group of multiple of the staged plurality of the non-duplicative data blocks; and prior to persisting data associated with the inline compression group to a data storage medium of the storage system, perform compression based on the inline compression group.

12. The storage system of claim 11, wherein each of the write requests includes one or two data blocks having a size of less than 32 kilobytes (KB) and wherein the compression group size is greater than or equal to 32 KB.

13. The storage system of claim 11, wherein the staging includes creating a list of inline storage efficiency (ISE) index nodes (inodes) to track compression work in a memory of the storage system.

14. The storage system of claim 13, wherein a number of the ISE inodes is limited and is potentially fewer than a number of files for which writes have been received.

* * * * *